Patented May 28, 1940

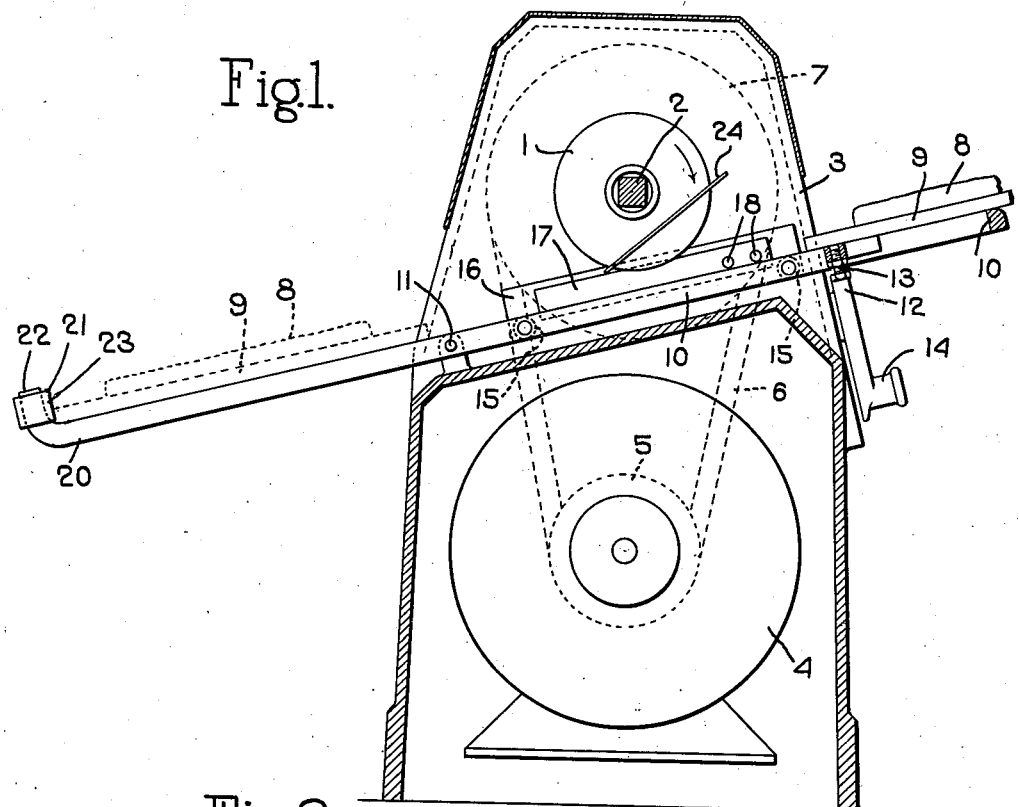
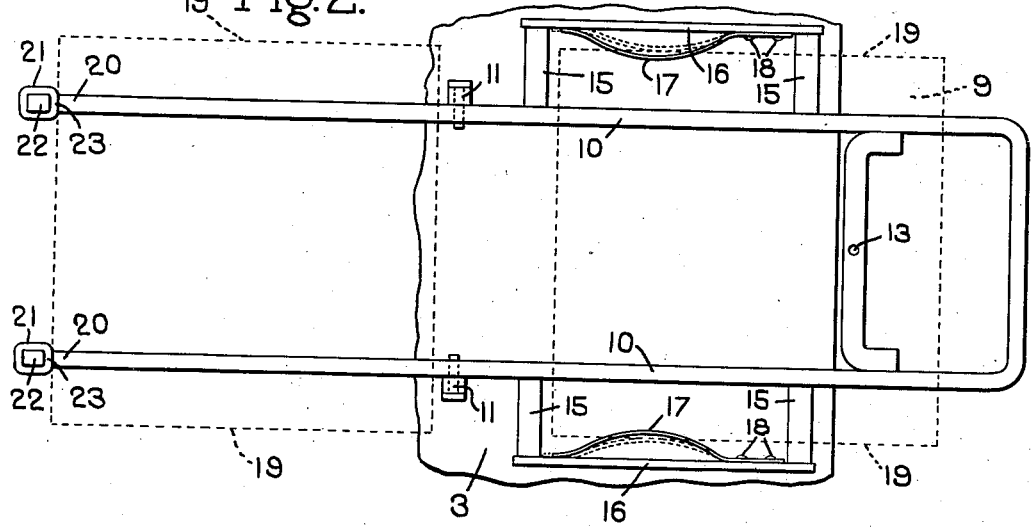

2,202,273

UNITED STATES PATENT OFFICE 2,202,273

MEAT-SLITTING MACHINE

Joseph P. Spang, Quincy, Mass., assignor to Cube Steak Machine Company, Inc., Boston, Mass., a corporation of Massachusetts Application December 15, 1936, Serial No. 115,926

6 Claims. (Cl. 17—27)

This invention relates to meat-slitting machines of that type in which the meat to be slit is supported on a meat-supporting plate that is separable from the frame of the machine, and is introduced to the rotary slitting knives at one side of the machine, and is fed through the machines past the knives, and then is discharged from the machine at the other side thereof.

A meat-slitting machine of this type is illustrated in my co-pending application Serial No. 91,676, filed July 21, 1936.

In the machine illustrated in said application the feeding movement of the meat and meat-supporting plate is derived from the action of the rotating knives on the meat during the slitting operation, the friction between the rapidly rotating knives and the meat serving to pull the meat and the meat-supporting plate forward.

The desired slits in the meat can be more satisfactorily cut if the knives are rotating with a peripheral speed considerably greater than the feeding movement of the meat so that the knives act on the meat with a draw cut.

Meat-slitting machines of this type are often provided with a stripper element which is adapted to engage the upper face of the slice of meat as it is being acted on by the knives, said stripper element serving to press the slice against the plate and prevent it from being lifted from the plate by the knives. While the pressure of the stripper element against the slice serves to apply some frictional drag to the slice and the meat-supporting plate, yet this is not always sufficient to prevent the slice and its supporting plate from being fed through the machine by the rapidly rotating knives at so rapid a rate that the meat is liable to become dislodged from the plate. To obviate this difficulty, I have provided herein means independent of and in addition to the stripper element to exercise a control over the forward feeding movement of the plate which is produced by the action of the rotating knives on the meat, such means acting to apply directly to the plate a retarding force which prevents it from being fed through the machine too rapidly. While this retarding control can be applied directly to the meat-supporting plate in various ways, I have herein shown means for applying a braking or dragging action to the edges of the meat-supporting plate while it is being fed through the machine. By this means the movement of the meat-supporting plate and meat thereon through the machine is controlled so that the knives will always be rotating at a much greater surface speed than the feeding movement of the meat and will, therefore, also operate with the desired draw cut. This controlling of the movement of the meat-supporting plate also prevents the latter from being fed through the machine at a speed which is likely to dislodge the meat from the plate.

In order to give an understanding of the invention I have illustrated in the drawing a selected embodiment thereof which willl now be described after which the novel features will be pointed out in the appended claims.

In the drawing;

Fig. 1 is a sectional view of a meat-slitting machine embodying my invention;

Fig. 2 is a fragmentary plan view of the plate-supporting member.

In the machine herein shown the rotary knives are indicated at 1 and these are mounted upon a knife shaft 2 which is supported in suitable bearings in the frame 3. The knives are rotated by means of a motor 4 which is housed within the frame of the machine, said motor having a driving pulley 5 thereon which is belted by a belt 6 to a pulley 7 on the knife shaft 2.

As stated above the slice of meat 8 which is to be slit is supported on a meat-supporting plate 9 which is separable from the frame of a machine, and the machine is provided with a plate-supporting member 10 which extends through the machine and on which the plate 9 is supported as it is fed past the knives. This plate-supporting member 10 may have a construction similar to that illustrated in my co-pending application Serial No. 91,676, and it is shown as being pivoted to the frame at 11 so that it can be moved toward and from the knives to vary the depth of the slits which are cut in the meat. The position of the supporting member 10 is controlled by an adjusting cam member 12 pivoted to the frame and which cooperates with the head of an adjustable stud 13 which is screw-threaded to the supporting member 10, this being substantially the same construction as shown in my above-mentioned co-pending application Serial No. 91,676. The cam 12 is shown as having a finger piece 14 by which it may be adjusted. 24 indicates a stripper element which engages the upper surface of the slice 8 as the latter is being acted on by the knives. This stripper element may have any suitable construction such as that illustrated in my co-pending application, Serial No. 91,676.

In using the machine a slice 8 of meat to be slit is placed on the meat-supporting plate 9 and the latter then is placed on the right-hand or receiving end of the supporting member 10, as shown in full lines, and the plate is then manually moved forwardly over the supporting member 10 until the knives 7, which are rapidly rotating in the direction of the arrow, begin to act on the meat. As soon as this occurs the friction of the knives on the meat will pull the meat and the meat-supporting plate forward, thus feeding the meat past the knives and the plate will emerge from the machine at the left-hand side thereof where it is discharged therefrom with the slit meat thereon.

In order to prevent the frictional engagement of the knives with the meat from pulling the meat through the machine too rapidly, I have provided by this invention a retarding or brake device which acts directly on the meat-supporting plate and applies a friction drag directly thereto while the knives are acting on the meat. One simple and convenient way of securing this end is illustrated in the drawing wherein the supporting member 10 is provided on each side with laterally-extending arms 15 connected by a member 16 to which is secured a semielliptic leaf spring 17, said spring being secured to the member 16 at one end as by means of rivets 18, while the other end of the leaf spring rests loosely against the member 16, the central portion of each spring presenting a convex plate-engaging surface. These springs are so made and supported that the normal minimum distance between the convex plate-engaging portions is somewhat less than the diameter of the meat-supporting plate 9, and they are positioned so that as the plate 9 is fed over the supporting member 10 the opposite edges 19 of said plate will engage the convex surfaces of the springs and compress the latter somewhat, said springs thus applying a frictional drag to the edges of the plate. By this means the feeding movement of the plate which is derived from frictional engagement of the knives with the meat is retarded somewhat so that the knives will operate on the meat with the desired draw cut.

The meat-supporting plate is preferably square so that after it has been fed through the machine once it can be turned through 90° and fed through a second time, whereby two series of slits will be cut in the meat which cross each other at right angles.

The supporting member 10 is preferably extended somewhat at the delivery side of the machine, as shown at 20, to provide a receiving portion for the meat-supporting plate as it is discharged from the machine. This extension 20 is also shown as formed with a stop 21 to prevent the meat-supporting plate from dropping off from the end of the supporting member. While this stop 21 may be made in any suitable way, I have herein shown it as one or more upstanding projections 22 rising from the end of the extension 20 and each provided with an envelope 23 of rubber or some other resilient material.

I claim:

1. A meat-slitting machine comprising a frame, a set of rotary slitting knives carried thereby, means to rotate the knives, a meat-supporting plate separable from the frame and adapted to support the meat to be slit, a plate-supporting member situated beneath the knives and having one end exposed on one side of the frame for the reception of said meat-supporting plate with an unslit slice of meat thereon, and the other end exposed at the other side of the frame for the discharge of said plate, said plate being free to be moved over said plate-supporting member solely by the action of the rotating knives on the meat from a position entirely on one side of the knives completely past the knives into a position entirely on the other side of said knives and in which it is free to be removed from the supporting member, a stripper element to engage the upper surface of the meat as it is being acted on by the knives, and means independent from the stripper element to apply a frictional drag directly to said plate while it is being fed past the knives by the frictional engagement between them and the meat whereby the knives will act on the meat with a draw cut.

2. A meat-slitting machine comprising a frame, a set of rotary slitting knives carried thereby, means to rotate the knives, a meat-supporting plate separable from the frame and adapted to support the meat to be slit, a plate-supporting member situated beneath the knives and having one end exposed on one side of the frame for the reception of said meat-supporting plate with an unslit slice of meat thereon, and the other end exposed at the other side of the frame for the discharge of said plate, said plate being freely slidable over said plate-supporting member at an indeterminate speed independent of the surface speed of the knives and from a position entirely on one side of the knives, completely past the knives into a position entirely on the other side of the knives and in which it is free to be removed from the supporting member, the frictional engagement of the knives with the meat tending to feed it and the plate forward, a stripper element to engage the upper surface of the meat as it is being acted on by the knives, and means independent from the stripper element to apply a frictional drag directly to the edges of the plate while the knives are acting on the meat.

3. A meat-slitting machine comprising a frame, a set of rotary slitting knives carried thereby, means to rotate the knives, a supporting member beneath the knives, a meat-supporting plate separable from the supporting member and adapted to slide the full length of said member from a position at one end thereof in which it is entirely on one side of the knives to a position at the other end thereof in which it is entirely on the other side of the knives and free to be removed from the supporting member, said knives when acting on the meat tending to feed the meat and the plate forward, a stripper element to engage the upper face of the slice as it is acted on by the knives, and spring means separate from the stripper element and operative only when the plate is passing beneath the knives to apply a frictional drag to the edges of the plate, whereby the speed of the forward movement which is given to the plate by the action of the knives on the meat is reduced below the surface speed of the knives and the latter will operate on the meat with a draw cut.

4. A meat-slitting machine comprising a frame, a set of rotary slitting knives carried thereby, means to rotate the knives, a meat-supporting plate separable from the frame and adapted to support the slice of meat to be slit, a plate-supporting member beneath the knives on which said plate is free to slide beneath the knives from one side of the machine to the other, a stripper element to engage the upper face of the slice as it is being acted on by the knives, and two oppositely-disposed semielliptical springs carried by said plate-supporting member and between which the plate passes as it moves beneath the knives, each spring presenting a convex surface to engage the edge of the plate and thereby apply thereto a retarding force.

5. A meat-slitting machine comprising a frame, a set of rotary slitting knives carried thereby, means to rotate the knives, a meat-supporting plate separable from the frame and adapted to support the slice of meat to be slit, a plate-supporting member beneath the knives over which the plate is free to be slid by the action of the rotary knives on the meat from one side of the machine to the other, thereby to carry the slice of meat past the knives, a stripper element to engage the upper face of the slice as the latter is being acted on by the knives, and means separate and independent from the stripper element to apply a frictional drag directly to said plate during that portion only of its complete journey from one side of the machine to the other, when it is passing beneath the knives.

6. A meat-supporting machine comprising a frame, a set of rotary slitting knives carried thereby, means to rotate the knives, a meat-supporting plate separable from the frame and adapted to support the slice of meat to be slit, a plate-supporting member beneath the knives on which the plate may freely slide from one side of the machine to the other, thereby to carry the slice of meat past the knives, a stripper element to engage the upper face of the meat as it is being acted on by the knives, a pair of arms extending laterally from each side of the plate-supporting member, a spring-supporting bar carried by each pair of arms and a semielliptical spring carried by each bar, said springs being adapted to engage the edges of the plate while it is passing beneath the knives.

JOSEPH P. SPANG.